US009294955B2

(12) United States Patent
Song et al.

(10) Patent No.: US 9,294,955 B2
(45) Date of Patent: *Mar. 22, 2016

(54) MANAGING ACKNOWLEDGMENT TRANSMISSIONS FROM MULTICAST GROUP MEMBERS OF A MULTICAST GROUP WITHIN A WIRELESS COMMUNICATIONS NETWORK

(71) Applicant: QUALCOMM Incorporated, San Diego, CA (US)

(72) Inventors: Bongyong Song, San Diego, CA (US); Harleen Gill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/062,084

(22) Filed: Oct. 24, 2013

(65) Prior Publication Data

US 2014/0050142 A1 Feb. 20, 2014

Related U.S. Application Data (62) Division of application No. 12/212,423, filed on Sep. 17, 2008, now abandoned.

(60) Provisional application No. 60/974,796, filed on Sep. 24, 2007, provisional application No. 60/974,831, filed on Sep. 24, 2007.

(51) Int. Cl.
*H04W 28/02* (2009.01)
*H04W 60/00* (2009.01)
(Continued)

(52) U.S. Cl.
CPC ........... *H04W 28/02* (2013.01); *H04L 12/1872* (2013.01); *H04L 47/10* (2013.01);
(Continued)

(58) Field of Classification Search
CPC . H04W 60/00; H04W 4/006; H04L 29/06333
See application file for complete search history.

(56) References Cited

U.S. PATENT DOCUMENTS 5,589,872 A 12/1996 Martinez
6,275,500 B1 8/2001 Callaway, Jr. et al.
(Continued)

FOREIGN PATENT DOCUMENTS

CN 1023617 C 1/1994
CN 1253641 A 5/2000
(Continued)

OTHER PUBLICATIONS

3GPP2, "CDMA2000 High Rate Broadcast-Multicast Packet Data Air Interface Specification," Feb. 14, 2006, Version 1.0, C.S0054-A, pp. 1-169.
(Continued)

*Primary Examiner* — Warner Wong
(74) *Attorney, Agent, or Firm* — Michael F. Taveira (57) ABSTRACT

Aspects of managing acknowledgment transmissions from multicast group members of a multicast group within a wireless communications network are disclosed. An access network transmits an announce message announcing a multicast session to a plurality of access terminals. One of the plurality of access terminals (i.e., a first responder) sends a BCMCS-FlowRegistration message and an announce acknowledgment (ACK) message to the access network. In an example, the BCMCSFlowRegistration message and announce ACK message are sent within the same access probe on a reverse link access channel. Next, the access network sends, in response to the received BCMCSFlowRegistration message, a suppression message to request access terminals not to send announce acknowledgment messages for the announced multicast session. Alternatively, an application server sends the suppression message in response to the received announce ACK message. In either scenario, the access terminals receiving the suppression message suppress transmission of subsequent announce ACK messages.

18 Claims, 8 Drawing Sheets

(51) Int. Cl.
  *H04L 12/801* (2013.01)
  *H04L 12/823* (2013.01)
  *H04W 76/00* (2009.01)
  *H04W 4/06* (2009.01)
  *H04W 4/10* (2009.01)
  *H04L 12/18* (2006.01)
  *H04W 72/00* (2009.01)

(52) U.S. Cl.
  CPC ............... *H04L 47/12* (2013.01); *H04L 47/14* (2013.01); *H04L 47/15* (2013.01); *H04L 47/32* (2013.01); *H04L 47/323* (2013.01); *H04W 4/06* (2013.01); *H04W 4/10* (2013.01); *H04W 60/00* (2013.01); *H04W 76/002* (2013.01); *H04L 12/189* (2013.01); *H04W 72/005* (2013.01)

(56) References Cited

U.S. PATENT DOCUMENTS

| | | | |
|---|---|---|---|
| 6,839,565 | B2 | 1/2005 | Sarkkinen et al. |
| 6,862,264 | B1 | 3/2005 | Moura et al. |
| 7,013,157 | B1 | 3/2006 | Norman et al. |
| 7,185,099 | B1 | 2/2007 | Block |
| 7,567,536 | B2 | 7/2009 | Czaja et al. |
| 8,570,950 | B2 * | 10/2013 | Kosaka .......................... 370/328 |
| 8,649,322 | B2 * | 2/2014 | Grandhi et al. ................ 370/328 |
| 8,670,359 | B2 * | 3/2014 | Kim et al. ...................... 370/312 |
| 8,830,846 | B2 * | 9/2014 | Grandhi et al. ................ 370/252 |
| 2002/0037736 | A1 | 3/2002 | Kawaguchi et al. |
| 2003/0157949 | A1 | 8/2003 | Sarkkinen et al. |
| 2003/0186176 | A1 | 10/2003 | Arakawa et al. |
| 2005/0111394 | A1* | 5/2005 | Jung et al. ..................... 370/312 |
| 2005/0281208 | A1 | 12/2005 | Dorenbosch et al. |
| 2006/0034241 | A1 | 2/2006 | Czaja et al. |
| 2006/0046762 | A1 | 3/2006 | Yoon et al. |
| 2006/0050659 | A1 | 3/2006 | Corson et al. |
| 2006/0098616 | A1 | 5/2006 | Kish et al. |
| 2006/0109859 | A1 | 5/2006 | Acharya et al. |
| 2006/0253601 | A1 | 11/2006 | Vedantham et al. |
| 2006/0258369 | A1 | 11/2006 | Burroughs et al. |
| 2007/0049314 | A1 | 3/2007 | Balachandran et al. |
| 2007/0076739 | A1 | 4/2007 | Manjeshwar et al. |
| 2007/0086382 | A1 | 4/2007 | Narayanan et al. |
| 2007/0192832 | A1 | 8/2007 | Qi et al. |
| 2007/0195769 | A1 | 8/2007 | Lin |
| 2007/0248063 | A1* | 10/2007 | Habetha ......................... 370/338 |
| 2007/0280153 | A1 | 12/2007 | Sinha |
| 2007/0281722 | A1 | 12/2007 | Gao |
| 2007/0281726 | A1 | 12/2007 | Rey et al. |
| 2008/0123578 | A1 | 5/2008 | Golitschek Edler Von Elbwart et al. |
| 2008/0130622 | A1* | 6/2008 | Hiertz et al. ................... 370/348 |
| 2008/0181163 | A1 | 7/2008 | Ye et al. |
| 2008/0310324 | A1 | 12/2008 | Chaponniere |
| 2009/0080355 | A1 | 3/2009 | Song |
| 2009/0080356 | A1 | 3/2009 | Song et al. |
| 2009/0080359 | A1 | 3/2009 | Song et al. |
| 2009/0080363 | A1 | 3/2009 | Song et al. |
| 2009/0213775 | A1 | 8/2009 | Rey et al. |
| 2009/0313379 | A1* | 12/2009 | Rydnell et al. ................ 709/228 |
| 2010/0017455 | A1 | 1/2010 | Svendsen et al. |
| 2010/0226263 | A1 | 9/2010 | Chun et al. |
| 2011/0080867 | A1* | 4/2011 | Mildh ............................ 370/328 |
| 2011/0182225 | A1 | 7/2011 | Song et al. |
| 2011/0274046 | A1 | 11/2011 | Rune et al. |
| 2013/0010775 | A1 | 1/2013 | Kish et al. |
| 2013/0121235 | A1 | 5/2013 | Song et al. |
| 2014/0050088 | A1 | 2/2014 | Song |

FOREIGN PATENT DOCUMENTS

| | | |
|---|---|---|
| CN | 1476259 | 2/2004 |
| CN | 101552682 A | 10/2009 |
| EP | 0731578 A2 | 9/1996 |
| EP | 1624610 A1 | 2/2006 |
| EP | 1770903 A1 | 4/2007 |
| JP | 04023525 | 1/1992 |
| JP | H05103033 A | 4/1993 |
| JP | H08317454 A | 11/1996 |
| JP | 2000115051 A | 4/2000 |
| JP | 2003051827 A | 2/2003 |
| JP | 2003511925 A | 3/2003 |
| JP | 2008509582 A | 3/2008 |
| JP | 2008522510 A | 6/2008 |
| JP | 2009517925 A | 4/2009 |
| KR | 100890060 B1 | 3/2009 |
| RU | 2259016 | 8/2005 |
| WO | 2006012946 A2 | 2/2006 |
| WO | 2006020970 | 2/2006 |
| WO | 2006058345 A1 | 6/2006 |
| WO | WO-2007102057 | 9/2007 |
| WO | 2009042695 A1 | 4/2009 |

OTHER PUBLICATIONS

European Search Report—EP12162165—Search Authority—Munich—Apr. 23, 2012.
European Search Report—EP13170123—Search Authority—Munich—Jul. 1, 2013.
International Preliminary Report on Patentability, PCT/US2008/076967, International Preliminary Examining Authority, European Patent Office, Feb. 5, 2010.
International Preliminary Report on Patentability, PCT/US2008/076990, International Preliminary Examining Authority, European Patent Office, Feb. 12, 2010.
International Search Report and Written Opinion—PCT/US2008/076967, International Search Authority, European Patent Office, Apr. 2, 2009.
International Search Report and Written Opinion—PCT/US2011/022457—ISA/EPO—Apr. 19, 2011.
International Search Report, PCT/US2008/076990, International Searching Authority, European Patent Office, Jul. 17, 2009.
Written Opinion, PCT/US2008/076990, International Searching Authority, European Patent Office, Jul. 17, 2009.

* cited by examiner

MANAGING ACKNOWLEDGMENT TRANSMISSIONS FROM MULTICAST GROUP MEMBERS OF A MULTICAST GROUP WITHIN A WIRELESS COMMUNICATIONS NETWORK

CLAIM OF PRIORITY UNDER 35 U.S.C. §119

The present Application for Patent is a Divisional application of Non-Provisional application Ser. No. 12/212,423, entitled "MANAGING ACKNOWLEDGMENT TRANSMISSIONS FROM MULTICAST GROUP MEMBERS OF A MULTICAST GROUP WITHIN A WIRELESS COMMUNICATIONS NETWORK", filed Sep. 17, 2008, which in turn claims priority to Provisional Application No. 60/974,796 entitled "Methods of Responding to an Interactive Multicast Message Within a Wireless Communication System" filed Sep. 24, 2007, and to Provisional Application No. 60/974,831 entitled "Methods of Managing Acknowledgment Transmissions From Multicast Group Members of a Multicast Group within a Wireless Communications Network" filed Sep. 24, 2007, each of which is assigned to the assignee hereof and each of which hereby expressly incorporated by reference herein in its entirety.

BACKGROUND OF THE INVENTION

1. Field of the Invention

The invention relates to communications in a wireless telecommunication system and, more particularly to methods of managing acknowledgment transmissions from multicast group members of a multicast group within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the invention are related to Managing acknowledgment transmissions from multicast group members of a multicast group within a wireless communications network. For example, an access network transmits an announce message announcing a multicast session to a plurality of access terminals. One of the plurality of access terminals (i.e., a first responder) sends a BCMCSFlowRegistration message and an announce acknowledgment (ACK) message to the access network. In an example, the BCMCSFlowRegistration message and announce ACK message are sent within the same access probe on a reverse link access channel. Next, the access network sends, in response to the received BCMCSFlowRegistration message, a suppression message to request access terminals not to send announce acknowledgment messages for the announced multicast session. Alternatively, an application server sends the suppression message in response to the received announce ACK message. In either scenario, the access terminals receiving the suppression message suppress transmission of subsequent announce ACK messages.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
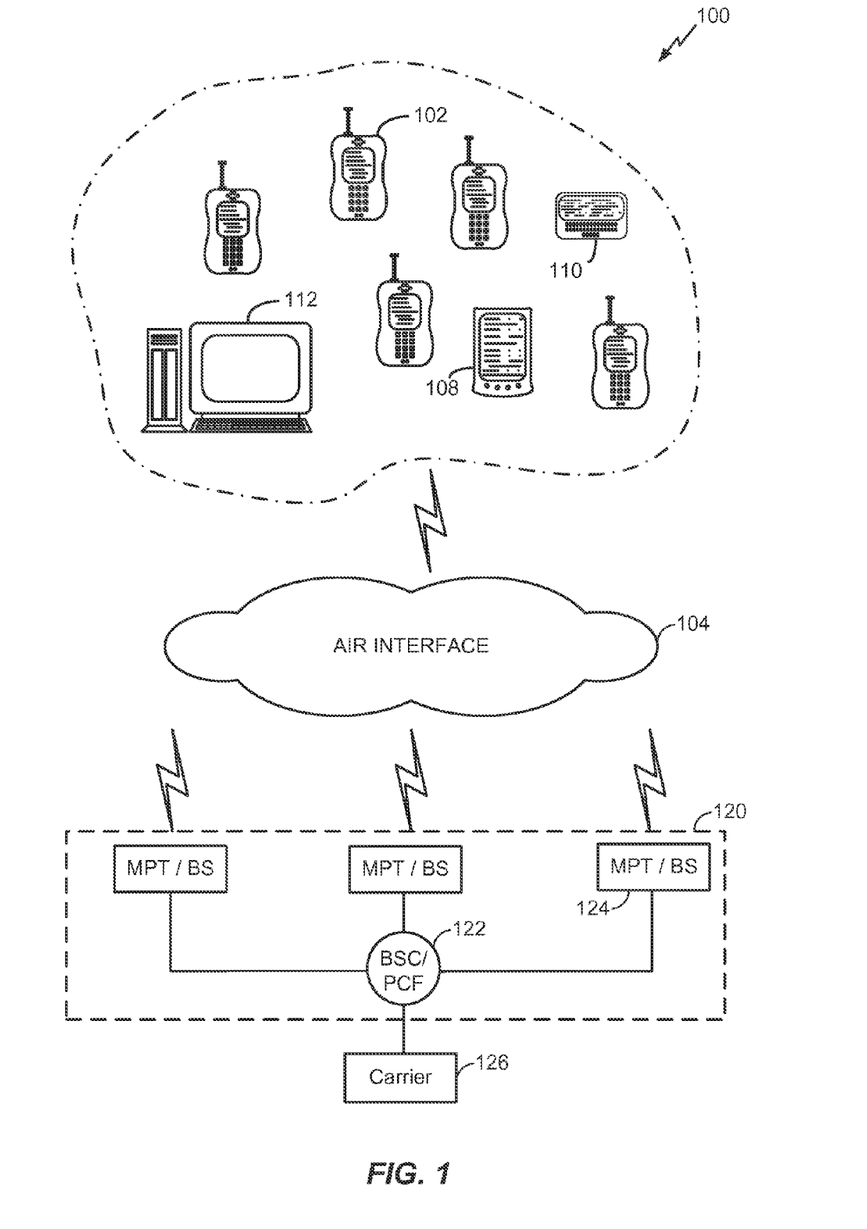
FIG. 1 is a diagram of a wireless network architecture that supports access terminals and access networks in accordance with at least one embodiment of the invention.

FIG. 1 illustrates a block diagram of one exemplary embodiment of a wireless communication system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or subcombination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
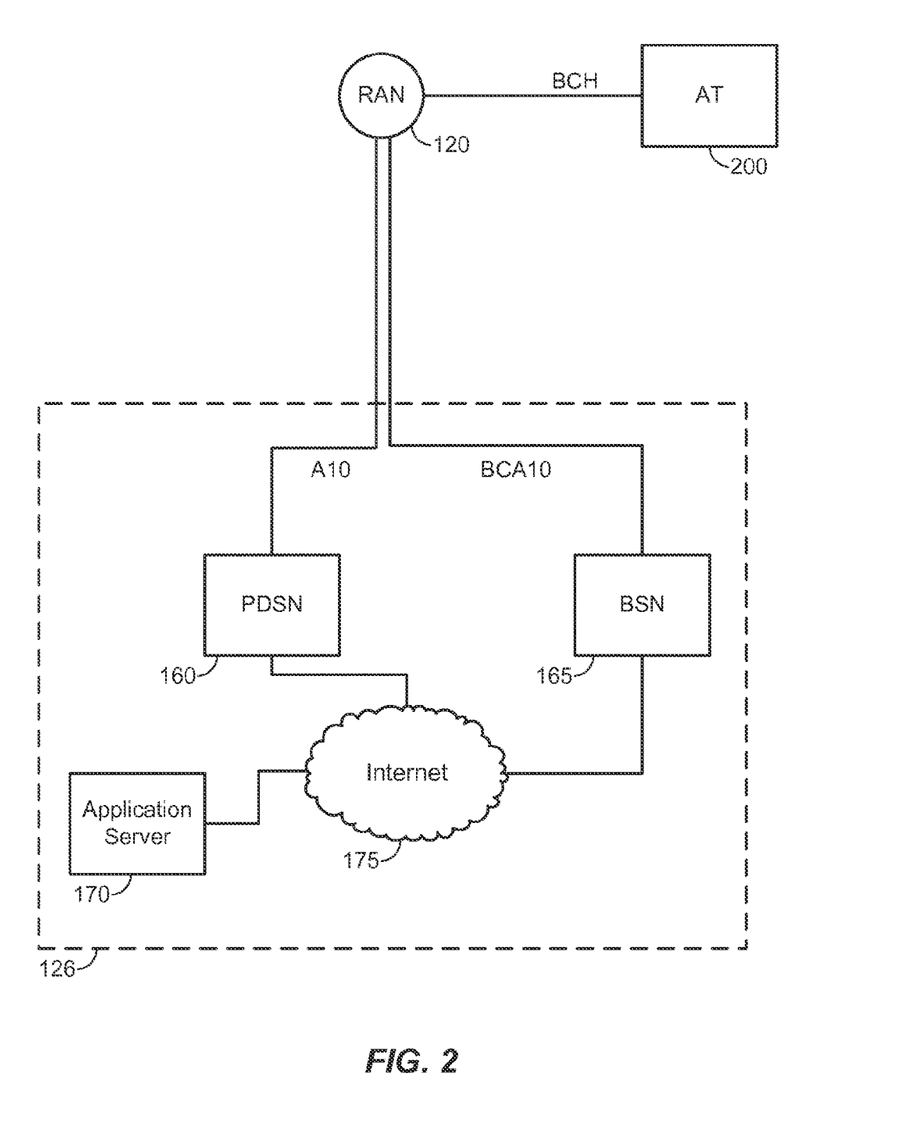
FIG. 2 illustrates the carrier network 126 according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
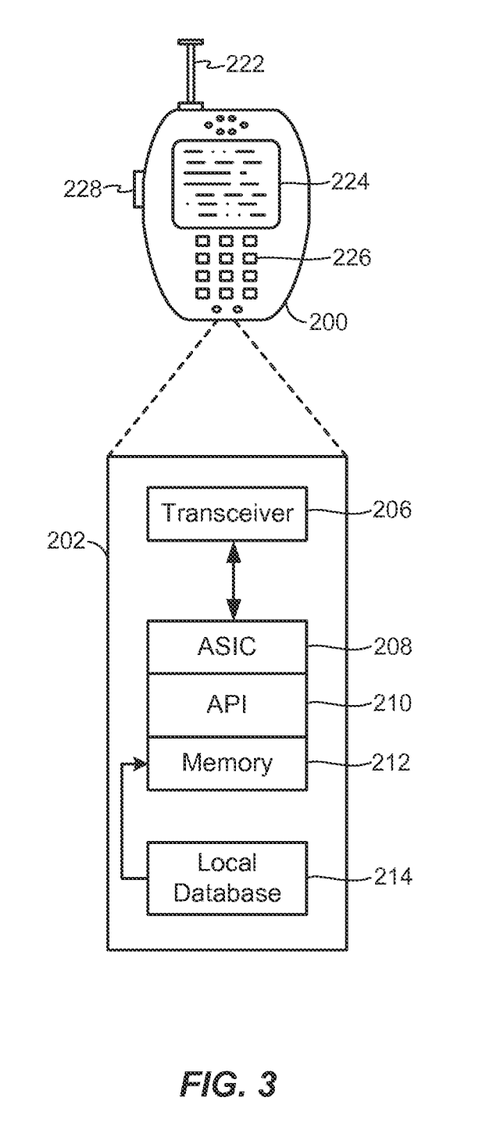
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
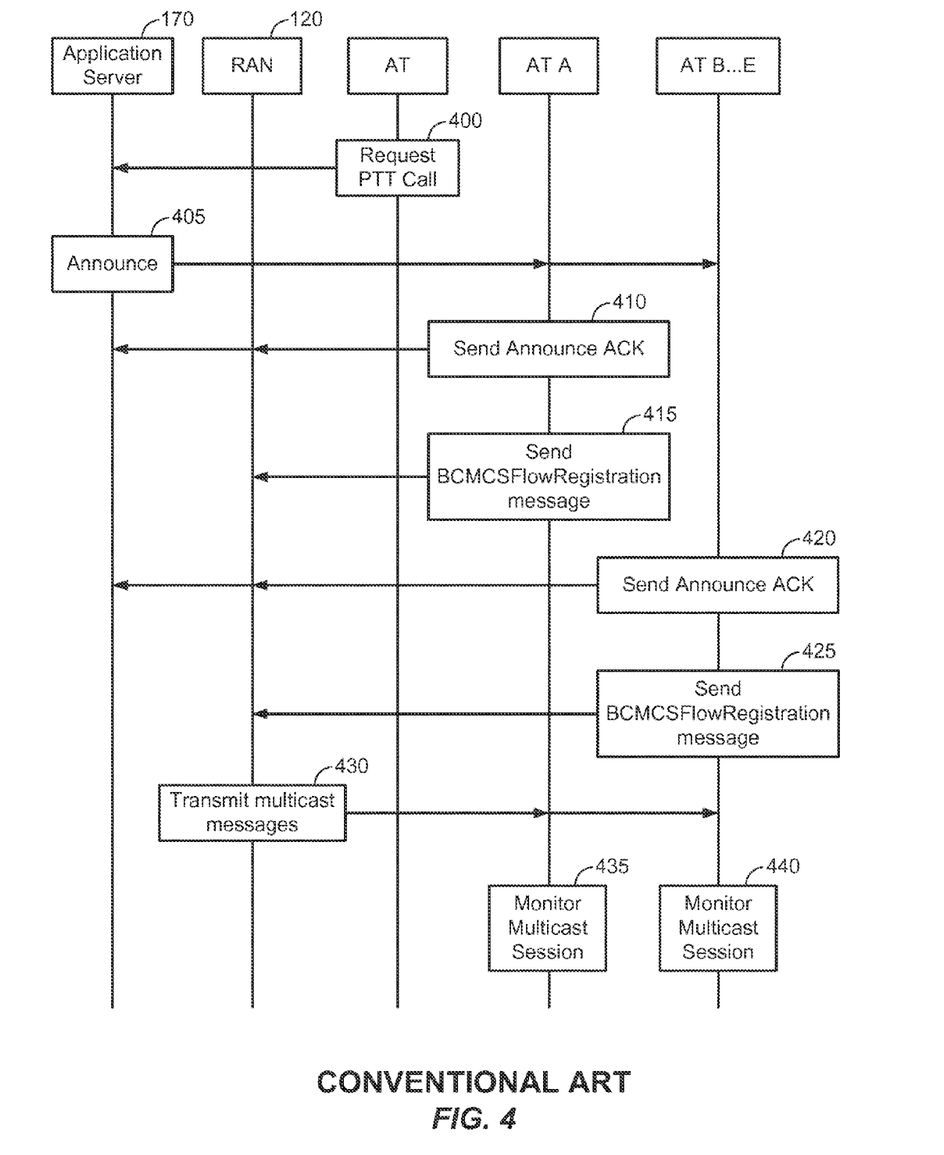
FIG. 4 illustrates a conventional multicast messaging process.

FIG. 4 illustrates a conventional multicast messaging process. In particular, FIG. 4 illustrates a broadcast and multicast service (BCMCS) messaging process supporting a push-to-talk (PTT) or multicast session.

In 400, one of a plurality of access terminals in communication with the RAN 120 ("PTT initiator") requests to initiate a PTT session, or multicast session. Accordingly, the PTT initiator sends a PTT call request to the application server 170 (e.g., a PTT server). Next, in 405, the application server 170 announces the PTT session to each multicast group member for the PTT session. For example, the application server 170 forwards the announce message to the RAN 120 via the PDSN 160 and/or BSN 165, and the RAN 120 transmits the announce message over the air interface 104 to a plurality of ATs. The announce message is transmitted in multiple sectors within the wireless communication system 100.

Figure 5:
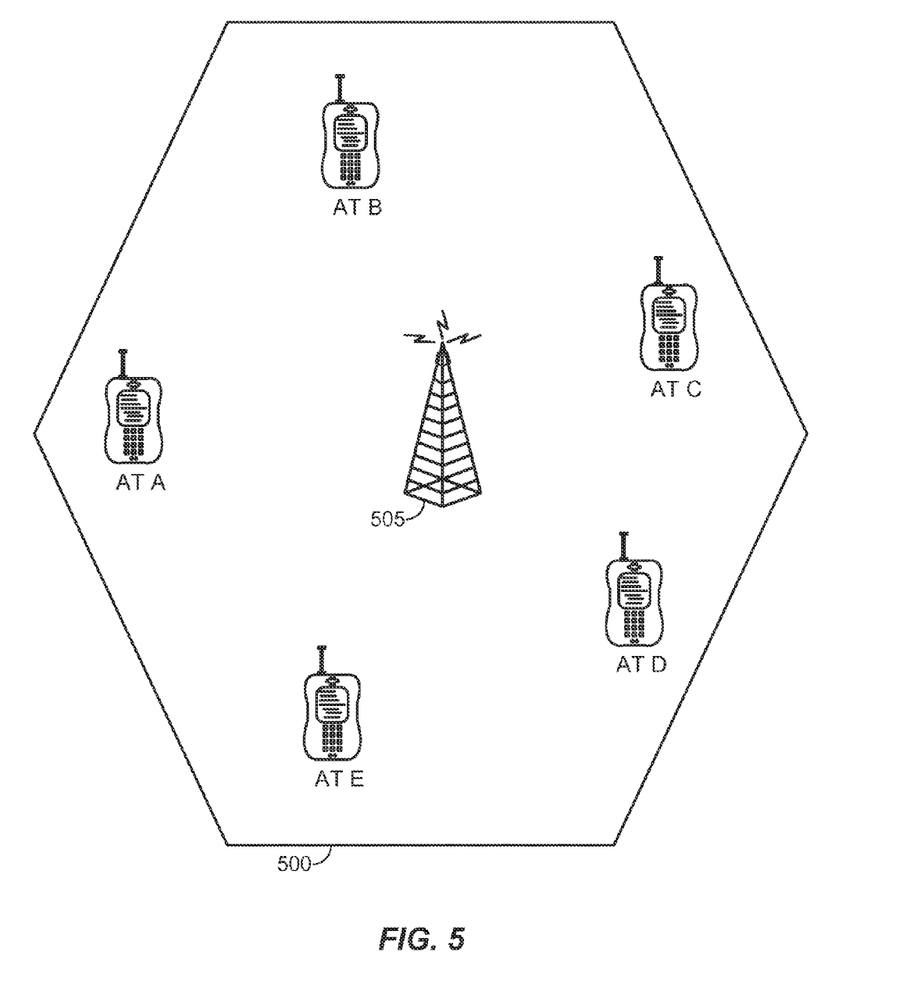
FIG. 5 illustrates a sector of the wireless communication system according to an embodiment of the present invention.

FIG. 5 illustrates a sector 500 of the wireless communication system 100 according to an embodiment of the present invention. The sector 500 includes a base station or MPT/BS 505. The sector 500, which corresponds to a region wherein ATs can be served by the base station 505, further includes ATs A through E. The PTT initiator discussed above with respect to 400 can be one of ATs A through E, or alternatively may correspond to an AT within another sector (not shown). For convenience of explanation, it will be assumed hereinafter that the PTT initiator is not present within sector 500 of FIG. 5.

Returning to FIG. 4, each of ATs A through E receives the announce message sent at 405. In 410, AT A responds to the announce message by sending an announce acknowledgment (ACK) message on a reverse link access channel to the base station 505 of the RAN 120. Also, in 415, AT A sends a BCMCSFlowRegistration message to the RAN 120 to register for the BCMCS flow associated with the announce message. While not shown explicitly within FIG. 4, the RAN 120 forwards the announce ACK message to the application or PTT server 170, and the RAN 120 adds AT A to a multicast group for the announced PTT session after receiving the BCMCSFlowRegistration message.

1x EV-DO standards provide the BCMCSFlowRegistration message for AT registration to multicast groups. Conventional BCMCSFlowRegistration messages include a listing of one or more BCMCS flows that a given AT is requesting to monitor. For example, if the announce message in 405 announces a PTT call associated with BCMCS Flow FLOW_1, then the BCMCSFlowRegistration messages sent in response to the announce message includes FLOW_1. BCMCSFlowRegistration messages may be sent to the RAN 120 at different times during a multicast or PTT session, and not merely in response to an announce message.

The first AT to respond to the announce message from 405 can be referred to as a "first responder". Accordingly, in FIG. 4, it may be assumed that AT A is the first responder (i.e., the first AT to respond in any sector). Next, each of ATs B through E responds to the announce message by sending an announce ACK message, 420. Each of ATs B through E also sends the BCMCSFlowRegistration message to register for the BCMCS flow announced in 425. It will be appreciated that while the announce ACK message transmission of 420 and the BCMCSFlowRegistration message transmission of 425 are shown as single steps, the announce ACK messages and BCMCSFlowRegistration messages may each be sent from different of the ATs B through E at different times, and 420 and 425 have been condensed into single blocks in FIG. 4 for convenience of explanation.

At some point after the first responder AT A sends the announce ACK message, in 430, the application server 170 begins the PTT session or call by providing the RAN 120 with multicast messages to be forwarded to base stations serving sectors including one or more ATs that have registered for the announced PTT session (e.g., ATs A through E in sector 500). Accordingly, in 435 and 440, respectively, ATs A through E monitor the multicast messages sent in 430 associated with the announced PTT session.

As discussed above with respect to FIGS. 4 and 5, an announce ACK message and BCMCSFlowRegistration message are sent from each AT that receives the announce message from 405. However, the application server 170 need only receive a single announce ACK message in order to determine to initiate the PTT session. In other words, the PTT session or call can begin (e.g., the PTT initiator can begin speaking or multicasting to at least one recipient) once the application server 170 receives an announce ACK message from the first responder. Thus, subsequent announce ACK messages can be redundant, and can increase interference on the reverse link access channel.

As discussed above, redundant announce ACK messages received at the application or PTT server 170 can increase interference on the reverse link access channel. Accordingly, embodiments of the present invention, which will now be described in greater detail, are directed to reducing or "suppressing" the number of announce ACK messages sent in response to an announce message announcing a PTT session.

Figure 6:
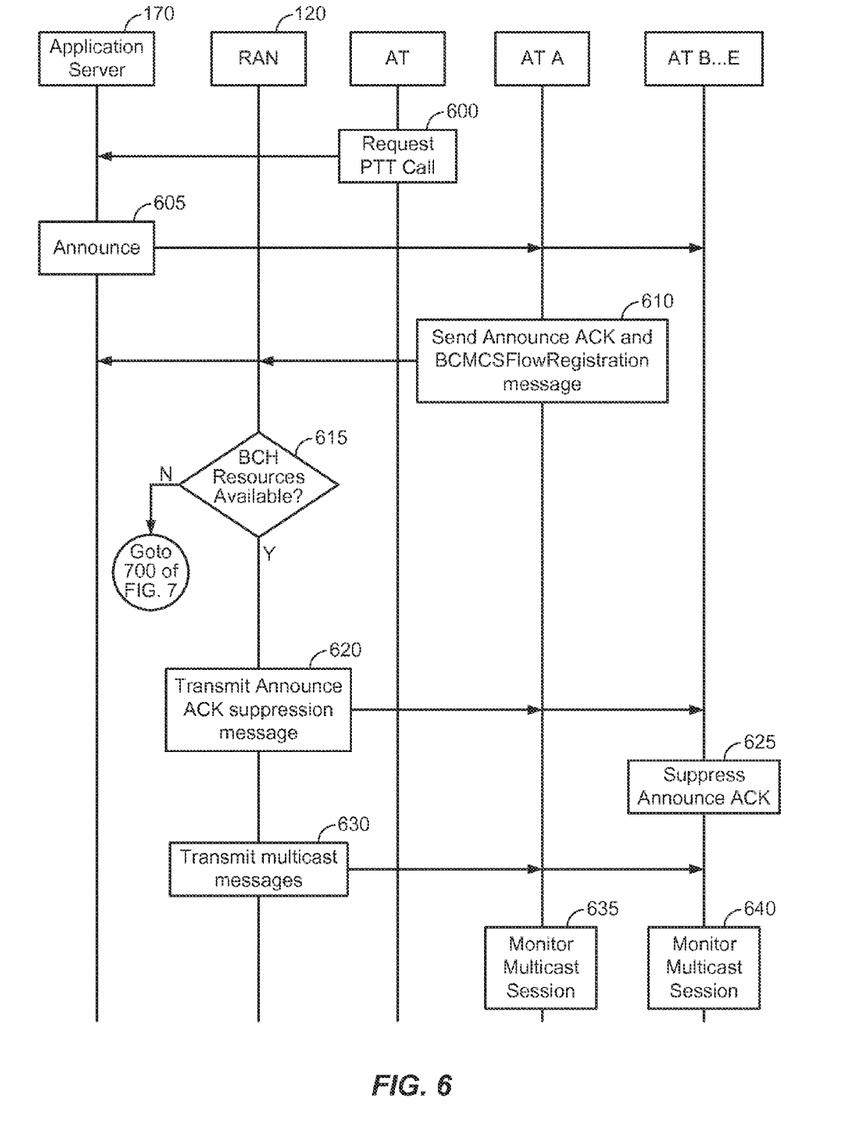
FIG. 6 illustrates a multicast messaging process according to an embodiment of the present invention.

FIG. 6 illustrates a multicast messaging process according to an embodiment of the present invention. In 600, one of a plurality of access terminals in communication with the RAN 120 ("PTT initiator") requests to initiate a PTT session, or multicast session. Accordingly, the PTT initiator sends a PTT call request to the application server 170 (e.g., a PTT server). Next, in 605, the application server 170 announces the PTT session to each multicast group member for the PTT session. For example, the application server 170 forwards the announce message to the RAN 120 via the PDSN 160 and/or BSN 165, and the RAN 120 transmits the announce message over the air interface 104 (e.g., over a downlink broadcast channel (BCH), over a downlink control channel, etc.) to a plurality of ATs. The announce message is transmitted in multiple sectors, including sector 500, within the wireless communication system 100.

In an example, the announce message sent in 605 may be bundled with an access control message (ACM), with the ACM providing feedback protocols for ATs. In other words, the ACM determines a manner in which ATs can respond to the announce message. For a further discussion of ACMs and feedback scheduling protocols, see U.S. Provisional Patent Application No. 60/974,796, entitled "METHODS OF RESPONDING TO AN INTERACTIVE MULTICAST MESSAGE WITHIN A WIRELESS COMMUNICATION SYSTEM", filed on Sep. 24, 2007, assigned by the assignee hereof, and expressly incorporated by reference herein in its entirety.

Below, the process of FIG. 6 is described as performed at sector 500 within the RAN 120. However, it will be appreciated that the process of FIG. 6 may concurrently be performed at other sectors (not shown) within the RAN 120.

In 610, AT A responds to the announce message by sending an announce ACK message on the reverse link access channel to the base station 505 of the RAN 120. In 610, the announce ACK message is "bundled" with a BCMCSFlowRegistration message within a single access probe to register for the BCMCS flow associated with the announce message. In contrast, as shown in FIG. 4, announce ACKs and BCMCSFlowRegistration messages sent in response to announce messages are not necessarily bundled together, and are rather typically sent independently on different access probes. Accordingly, it will be appreciated that synchronizing the transmission of the announce ACK and the BCMCSFlowRegistration message within a single access probe reduces the traffic load on the reverse link access channel. Further, while not shown explicitly within FIG. 4, the RAN 120 forwards the announce ACK message to the application or PTT server 170. In an example, the announce ACK message can be sent in accordance with an ACM that was previously sent to AT A (e.g., and other ATs). In this example, AT A may be the first to respond because the ACM designates AT A a first slot in which to respond to the announce message, while other ATs wait at least until AT A attempts to respond to the announce message before initiating their own attempt to respond. Alternatively, AT A may simply be the first AT to successfully respond irrespective of whether an AT response order is indicate via an ACM.

In 615, the RAN 120 determines whether the base station 505 has sufficient resources to handle the requested PTT session. For example, if the base station 505 of the RAN 120 is already participating in a number of PTT sessions, the amount of downlink bandwidth on the downlink broadcast channel (BCH) may be relatively limited, and the RAN 120 may determine that the base station 505 does not have sufficient resources to handle the announced PTT session. If the RAN 120 determines that sufficient resources are not available, the process advances to 700 of FIG. 7, which will be described in greater detail below. Otherwise, the process advances to 620 of FIG. 6.

In 620, the RAN 120/base station 505 transmits an announce ACK suppression message (e.g., over the downlink control channel, the downlink BCH, etc.). The announce ACK suppression message is sent to discourage ATs that have not yet responded to the announce message within the sector 500 from sending the announce ACK message. The announce ACK suppression message is sent by the RAN 120 at least at base station 505 within sector 500. However, the announce ACK suppression message can also be sent by the RAN 120 within each sector within which the announce message was announced in 605.

In an example, the announce ACK suppression message is a broadcast overhead message (BOM) that is sent in response to a first BCMCSFlowRegistration message received for the announced PTT session within a given sector. BOMs are well-known in the art, and include a listing of one or more BCMCS flow IDs for BCMCS flows carried within a given sector. BOMs also include information that instruct ATs with regard to how to "tune" to an advertised BCMCS flow on the downlink broadcast channel (BCH). Accordingly, in this example, the BOM sent in 620 includes the BCMCS flow ID for the announced PTT session.

Conventionally, BOMs are sent on the downlink control channel within reserved slots of the downlink control cycle. In this example, however, the BOM is sent at the first available or earliest slot of the downlink control channel cycle, and need not wait for the scheduled/reserved BOM slot(s). By sending the BOM, which in this example functions as an announce ACK suppression message, as early as possible, the chances of reaching ATs before transmission of an announce ACK message (and the BCMCSFlowRegistration message) increase.

However, in another embodiment, the BOM can be sent at its normal, reserved slot(s) on the downlink BCH in 620. In this alternative embodiment, the BOM still functions as an announce ACK suppression message because the ATs are configured to interpret any BOM for the announced PTT session as a request not to send an announce ACK message for the announced PTT session.

In another alternative embodiment, the announce ACK suppression message sent in 620 need not be a BOM (e.g., either an "immediate" BOM or a BOM sent on reserved downlink channel slots), but can be configured as a proprietary downlink message sent on the control channel. For example, the proprietary downlink message may correspond to a message that is not specified within 1x EV-DO protocols. In this example, in order to interpret the proprietary message as a request not to send announce ACK messages, the ATs may be specially configured to recognize the proprietary message as such.

In any of the above examples, it will be appreciated that not all ATs within the sector 500 need be specially configured to recognize either an immediate BOM, a conventional BOM, or a proprietary message as an announce ACK suppression message for proper operation. It will be appreciated that if more ATs can recognize announce ACK suppression messages within the sector 500, fewer announce ACK messages and/or BCMCSFlowRegistration messages need be sent.

In 625, ATs B through E, which received the announce message from 605 but have not yet sent announce ACK messages, receive the announce ACK suppression message. For purposes of explanation, assume each of ATs B through E have been configured to recognize announce ACK suppression messages (e.g., an immediate BOM for the announced PTT session, a conventional BOM for the announced PTT session, a proprietary announce ACK suppression message, etc.). Instead of sending the announce ACK message, ATs B through E suppress the announce ACK message transmission. For example, if the announce ACK suppression message is an "immediate" BOM for the announced PTT session (e.g., a BOM transmitted in a slot earlier than that of the reserved BOM slot of the downlink control channel cycle), each of ATs B through E can be configured to interpret the immediate BOM associated with the announced PTT session as a request not to send the announce ACK message, and so on.

Next, at some point after the first responder AT A sends the announce ACK message, the application server 170 begins the PTT session or call by providing the RAN 120 with multicast messages to be transmitted, in 630, on the downlink broadcast channel (BCH). Accordingly, in 635 and 640, respectively, ATs A through E monitor the multicast messages sent in 630 associated with the announced PTT session.

It will be appreciated that even though ATs B through E do not send announce ACK messages, ATs B through E are not precluded from monitoring the PTT session, and can monitor the periodic BOMs sent on the downlink control channel, and tune to multicast messages on the BCH, which collectively comprise the multicast messaging of the PTT session, in the same manner as AT A.

Further, it will be appreciated that only announce ACK messages need be suppressed in response to the announce ACK suppression message, and not necessarily BCMCS-FlowRegistration messages. While BCMCSFlowRegistration messages may be bundled with announce ACK messages, BCMCSFlowRegistration messages may also be sent separately. For example, whether a given AT sends a BCMCSFlowRegistration message can be based on a BOM field parameter. BOMs typically include a register for paging (RFP) field and a register for dynamic broadcast (RFDB) field. If the RFP field and/or the RFDB field is set to a first logic level (e.g., a higher logic level or logic "1"), ATs receiving the BOM may be prompted to send a BCMCSFlowRegistration message. Otherwise, if the RFP field and/or the RFDB field is set to a second logic level (e.g., a lower logic level or logic "0"), ATs receiving the BOM may not be prompted to send a BCMCSFlowRegistration message. Thus, if the announce ACK suppression message is a BOM and RFDB=0 or RFP=0, ATs B through E do not send an announce ACK message or a BCMCSFlowRegistration message, and if the announce ACK suppression message is a BOM and RFDB=1 or RFP=1, ATs B through E do not send an announce ACK message, but do send a BCMCSFlowRegistration message. For a further discussion of triggering BCMCSFlowRegistration messages via BOM field parameters, see U.S. Provisional Patent Application No. 60/974,808, entitled "METHODS OF SUPPORTING MULTICAST COMMUNICATIONS ASSOCIATED WITH OVERLAPPING CLUSTERS WITHIN A WIRELESS COMMUNICATIONS NETWORK", filed on Sep. 24, 2007, assigned by the assignee hereof, and expressly incorporated by reference herein in its entirety.

Figure 7:
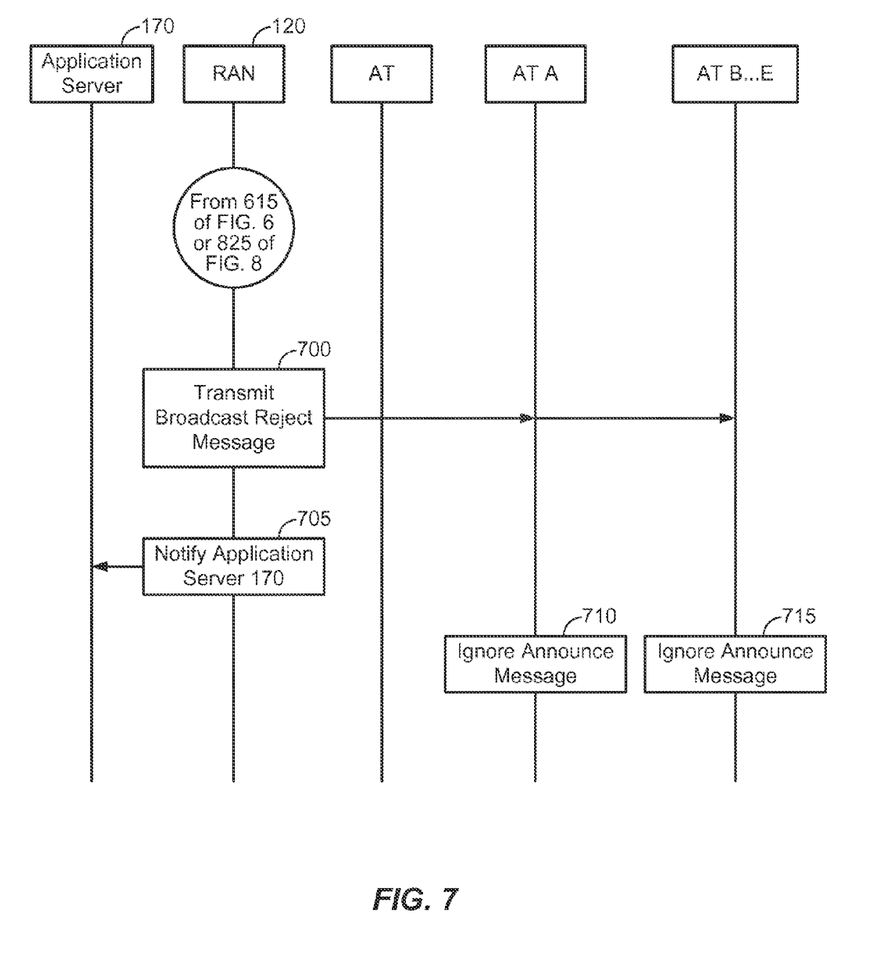
FIG. 7 illustrates a continuation of the process of FIG. 6 or the process of FIG. 8.

Returning to FIG. 6, in 615, if the RAN 120 determines that the base station 505 does not have sufficient resources to support the PTT session, the process advances to 700 of FIG. 7. In 700 of FIG. 7, the RAN 120 (e.g., via base station 505) transmits a broadcast reject message (BRM) to ATs A through E. BRMs are well-known in the art and defined by 1x EV-DO standards. The RAN 120 may also notify the application server 170 that the base station 505 cannot support the PTT session in 705. In 710, AT A receives the BRM and interprets the BRM as a request to ignore the announce message. In other words, AT A ignores the announce message by not attempting to monitor the announced PTT session (e.g., even though AT A previously attempted to register for the announced PTT session by sending the announce ACK message including the BCMCSFlowRegistration message in 610). Likewise, in 715, ATs B through E also receive the BRM and interpret the BRM as a request to ignore the announce message. In other words, similar to AT A, ATs B through E ignore the announce message by not attempting to monitor and/or register for the announced PTT session.

While FIGS. 6 and 7 are directed to "RAN implemented" announce ACK suppression processes, in an alternative embodiment, the application or PTT server 170 may generate the announce ACK suppression message.

Figure 8:
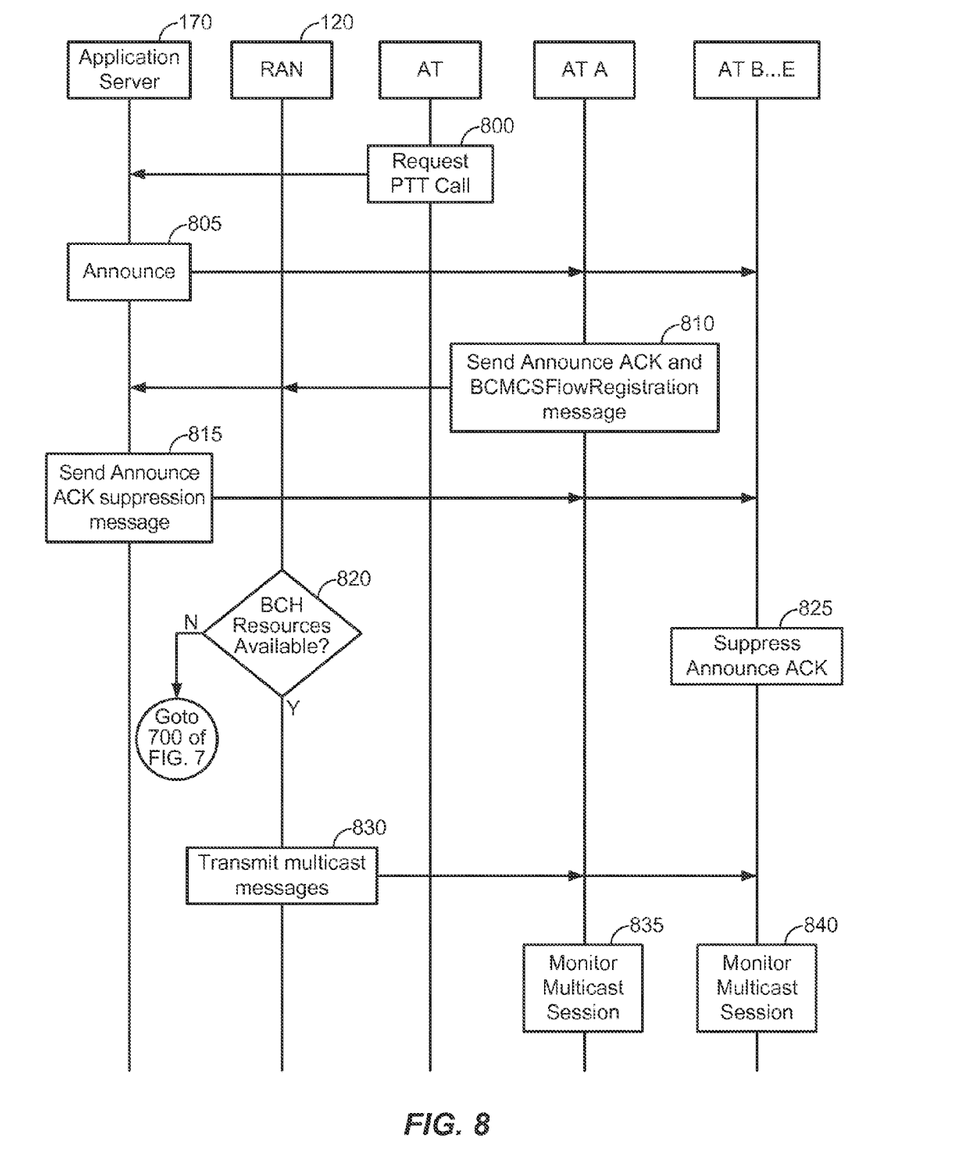
FIG. 8 illustrates a multicast messaging process according to another embodiment of the present invention.

FIG. 8 illustrates a multicast messaging process according to another embodiment of the present invention. In FIG. 8, 800, 805 and 810 correspond to 600, 605 and 610, respectively, of FIG. 6, and as such will not be described further for the sake of brevity.

In 815, after the application server 170 receives the announce ACK from the first responder AT A, the application server 170 sends an announce ACK suppression message to the RAN 120, which transmits the announce ACK suppression message at the base station 505 within sector 500 of FIG. 5 (e.g., on a downlink control channel, a downlink broadcast channel (BCH), etc.). While not shown explicitly within FIG. 8, the announce ACK suppression message sent from the application server 170 can also be sent to each sector that transmitted the announce message at 805. In another example, the announce ACK suppression message sent from the application server can be sent within a given "cluster" of the wireless communication system. For example, a cluster corresponds to a contiguous set of sectors carrying the multicast flow on a given interlace-multiplex pair of the downlink broadcast channel, wherein the contiguous set of sectors includes both (i) target sectors that are expected to include one or more multicast group members and (ii) supporting sectors that satisfy a given relationship with the target sectors, are not expected to include any multicast group members and are configured to carry the multicast flow as well in order to "support" the target sectors. Clusters, target sectors and supporting sectors are described in more detail within U.S. Provisional Patent Application No. 60/974,808, entitled "METHODS OF SUPPORTING MULTICAST COMMUNICATIONS ASSOCIATED WITH OVERLAPPING CLUSTERS WITHIN A WIRELESS COMMUNICATIONS NETWORK", filed on Sep. 24, 2007, assigned by the assignee hereof, and expressly incorporated by reference herein in its entirety. Thus, the announce ACK suppression message may be sent in one (or more) clusters of the wireless communication system. In this example, the announce ACK suppression message may be a proprietary message, and the respective multicast group members or ATs may be configured to recognize the announce ACK suppression message and interpret the announce ACK suppression message as a request not to send an announce ACK for a particular announced PTT session. For convenience of explanation, the process of FIG. 8 is described below assuming that all ATs are configured to recognize announce ACK suppression messages.

In 820, the RAN 120 determines whether the base station 505 has sufficient resources to handle the requested PTT session. For example, if the base station 505 of the RAN 120 is already participating in a number of PTT sessions, the amount of downlink bandwidth may be relatively limited and the RAN 120 may determine that the base station 505 does not have sufficient resources to handle the announced PTT session. If the RAN 120 determines that sufficient resources are not available, the process advances to 700 of FIG. 7.

In 825, ATs B through E, which received the announce message from 805 but have not yet sent announce ACK messages, receive the announce ACK suppression message generated at the application server 170. Instead of sending the announce ACK message, ATs B through E suppress the announce ACK message transmission. For example, if the announce ACK suppression message embodied as a proprietary downlink control message, each of ATs B through E is configured to interpret the proprietary downlink control message as a request not to send the announce ACK message for the announced PTT session.

Next, at some point after the first responder AT A sends the announce ACK message, the application server 170 begins the PTT session or call by providing the RAN 120 with multicast messages to be transmitted in 830 on the downlink broadcast channel (BCH). Accordingly, in 835 and 840, respectively, ATs A through E monitor the multicast messages sent in 830 associated with the announced PTT session.

It will be appreciated that even though ATs B through E do not send announce ACK messages, ATs B through E are not precluded from monitoring the PTT session, and can monitor the BOMs on the downlink control channel and multicast messages on the BCH, which collectively comprise the multicast messaging of the PTT session, in the same manner as AT A. Further, it will be appreciated that only announce ACK messages need be suppressed, and not necessarily BCMCS-FlowRegistration messages. This concept is discussed above in the description of FIG. 6 in greater detail with respect to RFDB and RFP fields within the BOM used to either trigger or suppress BCMCSFlowRegistration messaging.

While above-described embodiments of the present invention are directed to specific implementations wherein an announce ACK suppression message is sent to ATs within a given sector either from a base station serving the sector or from a centralized PTT server, it will be appreciated that any communication entity recognizing a first responder to an announced PTT session may be capable of initiating the transmission of the announce ACK suppression message. Thus, other embodiments of the present invention may be directed to any implementation wherein an announce ACK suppression message is transmitted to one or more sectors responsive to a first responder to a PTT session.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of sending acknowledgments to multicast announce messages within a wireless communications network, comprising:

receiving, at an access terminal, an announce message announcing a multicast session, the announced multicast session being a multicast session that the access terminal wishes to monitor; and sending, from the access terminal, a multicast registration message requesting registration to the announced multicast session for the access terminal and an announce acknowledgment message acknowledging that the announce message has been received, the multicast registration message and announce acknowledgment message being sent to an access network within a single bundled transmission on a reverse link channel.

2. The method of claim 1, further comprising:

receiving an access control message (ACM) that indicates a manner in which the access terminal is to attempt to send response messages to the announce message; and selecting an access probe upon which to send the multicast registration message and the announce acknowledgment message within the single bundled transmission based on the ACM.

3. The method of claim 1, wherein the multicast registration message is a BCMCSFlowRegistration message.

4. The method of claim 1, wherein the sending delays a transmission of at least one of the multicast registration message or the announce acknowledgment message such that the multicast registration message and the announce acknowledgment message are sent together on the single bundled transmission on the reverse link channel.

5. An access terminal, comprising:
a transceiver configured to:
receive an announce message announcing a multicast session, the announced
multicast session being a multicast session that the access terminal wishes to monitor; and
send a multicast registration message requesting registration to the announced multicast session for the access terminal and an announce acknowledgment message acknowledging that the announce message has been received, the multicast registration message and announce acknowledgment message being sent to an access network within a single bundled transmission on a reverse link channel.

6. The access terminal of claim 5, wherein the transceiver is further configured to receive an access control message (ACM) that indicates a manner in which the access terminal is to attempt to send response messages to the announce message, further comprising:
a processor configured to select an access probe upon which to send the multicast registration message and the announce acknowledgment message within the single bundled transmission based on the ACM.

7. The access terminal of claim 5, wherein the transceiver delays a transmission of at least one of the multicast registration message or the announce acknowledgment message such that the multicast registration message and the announce acknowledgment message are sent together on the single bundled transmission on the reverse link channel.

8. An access terminal, comprising:
means for receiving an announce message announcing a multicast session, the announced multicast session being a multicast session that the access terminal wishes to monitor; and
means for sending a multicast registration message requesting registration to the announced multicast session for the access terminal and an announce acknowledgment message acknowledging that the announce message has been received, the multicast registration message and announce acknowledgment message being sent to an access network within a single bundled transmission on a reverse link channel.

9. The access terminal of claim 8, further comprising:
means for receiving an access control message (ACM) that indicates a manner in which the access terminal is to attempt to send response messages to the announce message; and
means for selecting the access probe upon which to send the multicast registration message and the announce acknowledgment message based on the ACM.

10. The access terminal of claim 8, wherein the means for sending delays a transmission of at least one of the multicast registration message or the announce acknowledgment message such that the multicast registration message and the announce acknowledgment message are sent together on the single bundled transmission on the reverse link channel.

11. A non-transitory computer-readable medium including program code stored thereon, the program code configured to operate within an access terminal, comprising:
program code to receive an announce message announcing a multicast session, the announced multicast session being a multicast session that the access terminal wishes to monitor; and
program code to send a multicast registration message requesting registration to the announced multicast session for the access terminal and an announce acknowledgment message acknowledging that the announce message has been received, the multicast registration message and announce acknowledgment message being sent to an access network within a single bundled transmission on a reverse link channel.

12. The non-transitory computer-readable medium of claim 11, further comprising:
program code to receive an access control message (ACM) that indicates a manner in which the access terminal is to attempt to send response messages to the announce message; and
program code to select an access probe upon which to send the multicast registration message and the announce acknowledgment message within the single bundled transmission based on the ACM.

13. The non-transitory computer-readable medium of claim 11, wherein the program code to send delays a transmission of at least one of the multicast registration message or the announce acknowledgment message such that the multicast registration message and the announce acknowledgment message are sent together on the single bundled transmission on the reverse link channel.

14. The method of claim 1, wherein the single bundled transmission corresponds to a transmission of both the multicast registration message and the announce acknowledgment message within the same access probe on the reverse link channel.

15. The access terminal of claim 5, wherein the single bundled transmission corresponds to a transmission of both the multicast registration message and the announce acknowledgment message within the same access probe on the reverse link channel.

16. The access terminal of claim 8, wherein the single bundled transmission corresponds to a transmission of both the multicast registration message and the announce acknowledgment message within the same access probe on the reverse link channel.

17. The non-transitory computer-readable medium of claim 11, wherein the single bundled transmission corresponds to a transmission of both the multicast registration message and the announce acknowledgment message within the same access probe on the reverse link channel.

18. The method of claim 1,
wherein the announce message originates from an application server that is external to the access network and is configured to arbitrate the multicast session,
wherein the multicast registration message is configured to request that the access network register the access terminal to the multicast session, and
wherein the announce acknowledgment message is configured to acknowledge to the application server that the announce message has been received by the access terminal.

* * * * *